United States Patent [19]
Stewart

[11] Patent Number: 5,436,812
[45] Date of Patent: Jul. 25, 1995

[54] AIRPORT MARKER SYSTEM

[76] Inventor: John C. Stewart, 15151 Chillicothe Rd., Novelty, Ohio 44072

[21] Appl. No.: 936,128

[22] Filed: Aug. 27, 1992

[51] Int. Cl.$^6$ .............................................. F21C 1/021
[52] U.S. Cl. .................................................. 362/153.1
[58] Field of Search ...................... 362/145, 153, 153.1, 362/382, 431, 72, 84; 403/306, 343; 404/9, 12, 13; 256/13.1; 116/63 R

[56] References Cited

U.S. PATENT DOCUMENTS

| | | | |
|---|---|---|---|
| 2,260,253 | 10/1941 | Johnson | 362/431 |
| 3,153,773 | 10/1964 | Wood | 362/84 |
| 3,890,497 | 6/1975 | Rush | 362/72 |
| 4,104,711 | 8/1978 | Carter | 362/153 |
| 4,183,076 | 1/1980 | Bodde | 362/431 |
| 4,240,766 | 12/1980 | Smith et al. | 256/13.1 |
| 4,302,799 | 11/1981 | Behrens | 362/145 |
| 4,344,110 | 8/1982 | Ruediger | 362/32 |
| 4,594,020 | 6/1986 | Hughes | 403/343 |
| 4,638,411 | 1/1987 | Trainor | 362/145 |

FOREIGN PATENT DOCUMENTS 2069032  8/1981  United Kingdom .................... 404/9

OTHER PUBLICATIONS

Hughey & Phillips, Inc., Brochure Entitled "Hughey & Phillips Model MS61" (1976).
J. C. Stewart Enterprises, Inc., Advertisement Entitled "The Flexibles" (1992).

Primary Examiner—Ira S. Lazarus
Assistant Examiner—Y. Quach
Attorney, Agent, or Firm—Renner, Otto, Boisselle & Sklar

[57] ABSTRACT

A marker system comprising a marker light and a marker; the marker light including a base plate having a plurality of bolt holes and a plurality of mounting bolts having threaded shanks extending through the bolt holes for securing the base plate to a support surface including threaded holes for receiving the threaded shanks of the mounting bolts; and a marker including a resiliently flexible marker rod having a height greater than the marker light and an attachment fitting at the lower end of the marker rod. The attachment fitting has a lower threaded shank portion for extending through one of the bolt holes in the base plate normally occupied by one of the mounting bolts, an intermediate head portion, and an upper portion to which the marker rod is attached. The marker is substituted for one of the mounting bolts and in effect forms a readily observable vertical extension of the marker light, while being flexible and bendable to accommodate, without damage, inadvertent contact, for example, with the wing of a taxying aircraft. The marker further assists in identifying the edge of a taxiway or runway, or for that matter any other way, when the marker lights have become hidden from view such as by a heavy accumulation of snow.

19 Claims, 2 Drawing Sheets

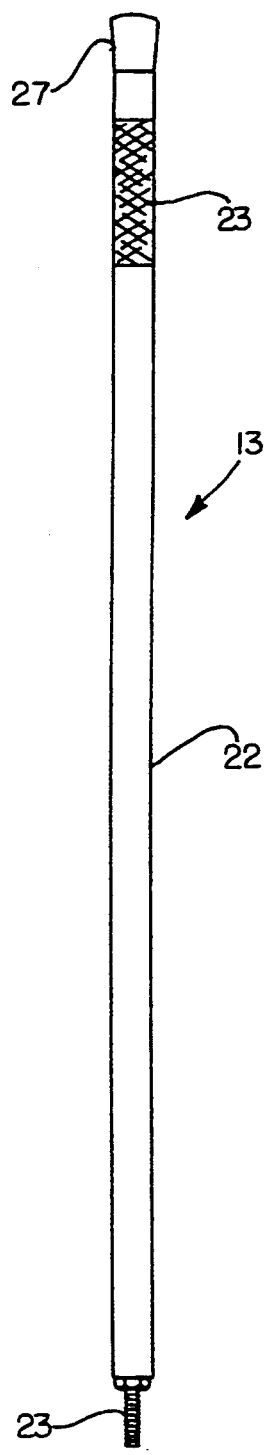
FIG. 2
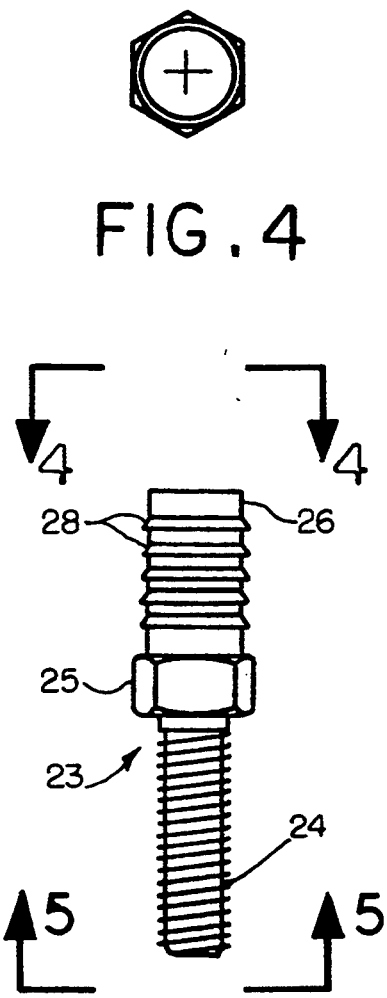
FIG. 4
FIG. 3
FIG. 5

AIRPORT MARKER SYSTEM

The invention herein described relates generally to marker systems and more particularly to airport marker systems used to delineate airport runways, taxiways and the like.

BACKGROUND

Marker lights are used for edge lighting of runways and taxiways at airports. The marker lights generally comprise a light fixture and a mounting assembly. Stake mounting assemblies and base mounting assemblies heretofore have been used, with the latter including a base plate having a peripheral arrangement of bolt holes through which mounting bolts extend for attaching the base to a support surface such as a concrete pad including threaded anchors for the bolts.

The marker lights typically are of relatively short height. As a result, marker lights near a taxying aircraft are oftentimes obscured from the pilot's view. Consequently, the pilot may not be able to visually ascertain the position of his aircraft relative to the edge of the taxiway that is marked by the marker lights. Excessive glare under bright sunlight conditions or heavy blowing snow creating "white out" can make it very difficult to see the marker lights, if at all. Also, the marker lights may on occasion become hidden from view such as by a heavy accumulation of snow.

In an effort to solve the above problems, a prior art practice had been to use fabric flags on wire posts stuck in the ground. One drawback with these flags was that jet engines had a tendency to blow apart the flags. Today, the FAA has designated the flags as foreign object debris thereby precluding their use at FAA controlled airports.

SUMMARY OF THE INVENTION

The present invention provides an inexpensive yet effective accessory device for enhancing the functional purpose of the marker lights, i.e., to indicate the edge of a taxiway, runway or the like. According to the invention, such device consists of a marker comprising a resiliently flexible marker rod having a height greater than the marker light and an attachment fitting at the lower end of the marker rod. The attachment fitting has a lower threaded shank portion for extending through one of the bolt holes in the base plate normally occupied by one of the mounting bolts, an intermediate head portion, and an upper portion to which the marker rod is attached. Accordingly, the marker may be substituted for one of the mounting bolts to provide a marker system comprising the marker and marker light. In such system, the marker in effect forms a readily observable vertical extension of the marker light, while being flexible and bendable to accommodate, without damage, inadvertent contact, for example, with the wing of a taxying aircraft. The marker further assists in identifying the edge of a taxiway or runway, or for that matter any other way, when the marker lights have become blinded from view because of sun glare or "white out" conditions or when the marker lights have become hidden from view such as by a heavy accumulation of snow.

According to a preferred embodiment of the invention, the marker preferably is tubular and has a lower end portion thereof telescoped over the upper portion of the fitting which preferably is provided with axially spaced apart, annular ribs which function to grip the interior surface of the lower end portion of the marker rod thereby to securely hold the marker rod to the attachment fitting, while providing for easy assembly of the marker rod by simply pushing the marker rod onto the attachment fitting. The marker rod preferably has a fluorescent exterior surface and more preferably is made of a translucent fluorescent color nylon material which functions in part as a light pipe by absorbing light from the marker light as well as from other light sources such as the headlights of an approaching aircraft and conducting same along the length thereof for emission of light along the length thereof.

The foregoing and other features of the invention are hereinafter fully described and particularly pointed out in the claims, the following description and the annexed drawings setting forth in detail a preferred embodiment of the invention, this being indicative, however, of but one of the various ways in which the principles of the invention may be employed.

BRIEF DESCRIPTION OF THE DRAWINGS

FIG. 2 is an elevational view of the marker used in the marker system of FIG. 1.

FIG. 3 is an elevational view of an attachment fitting used in the marker of FIG. 2.

FIG. 4 is a top plan view of the attachment fitting taken from the line 4—4 of FIG. 3.

FIG. 5 is a bottom plan view of the attachment fitting taken from the line 5—5 of FIG. 3.

DETAILED DESCRIPTION

Figure 1:
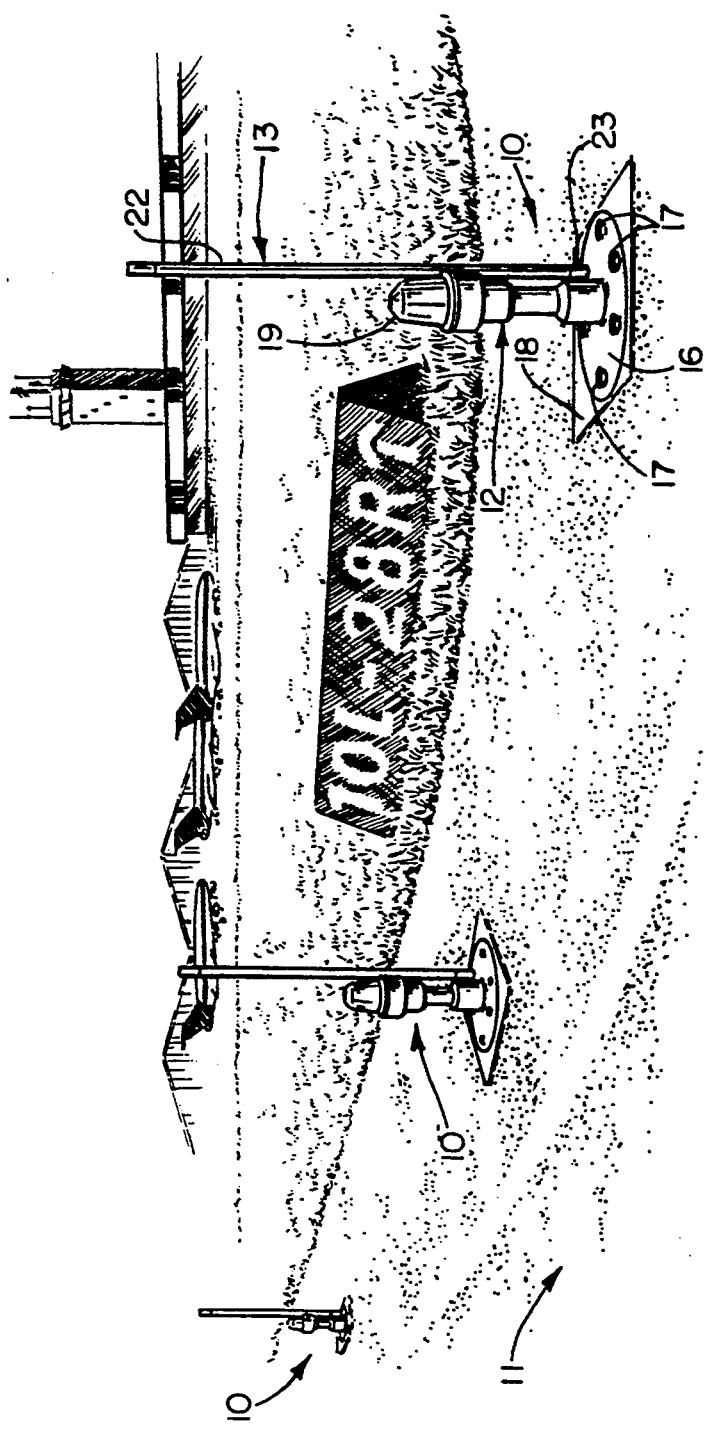
FIG. 1 is a perspective view of a marker system according to the invention showing the marker system as employed at an airport to mark the edge of a taxiway.

Because the invention was conceived and developed for airport taxiways, and is particularly useful for such, it will be described chiefly in this context. However, the invention in its broader aspects could be used in other applications, as will be appreciated by those skilled in the art.

Referring now in detail to the drawings and initially to FIG. 1, a marker system according to invention is indicated generally at 10. The marker system 10 along with like marker systems are used to mark the edge of a taxiway 11. The marker system generally comprises a marker light 12 and a marker 13.

The marker light 12, which may be a prior art base mounted Model MS61 marker light sold by Hughey & Phillips, Inc. of Simi Valley, Calif., U.S.A., includes a base plate 16 having a plurality of bolt holes arranged around the periphery thereof. A plurality of mounting bolts 17 have threaded shanks extending through the bolt holes for securing the base plate to a support surface such as a concrete pad 18 including threaded bolt anchors or the like for receiving the threaded shanks of the mounting bolts. Mounted to the base plate by a breakable coupling is a light fixture 19.

The marker 13 includes a resiliently flexible marker rod 22 and an attachment fitting 23 at the lower end of the marker rod. With additional reference to FIGS. 2-5, the attachment fitting 23 has a lower threaded shank portion 24 for extending through one of the bolt holes in the base plate 16 not occupied by a mounting bolt 17, an intermediate head portion 25, and an upper portion 26 to which the marker rod is attached. The intermediate head portion 25 preferably has the same configuration as the heads of the mounting bolts 17, whereby the attachment fitting may be tightened by the same wrench used to tighten the mounting bolts. Likewise, the lower threaded shank portion 24 has the same thread pattern as the shanks of the mounting bolts so that it may be substituted for one of the mounting bolts as discussed further below.

The marker rod 22 preferably is tubular and has a cap 27 closing the top end thereof. The lower end portion of the marker rod is telescoped over the upper portion 26 of the attachment fitting 23. The upper portion 26 has a plurality of axially spaced apart ribs 28 extending annularly around the upper portion of the fitting for gripping the interior surface of the marker tube when forcibly telescoped over the upper portion of the attachment fitting. The ribs 28 preferably are conical with the narrower end of each disposed towards the top end of the attachment fitting, thereby to facilitate slipping of the marker rod over the ribs while the ribs function to grip the marker to prevent withdrawal of the marker rod from the attachment fitting. That is, the force required to axially separate the marker rod from the attachment fitting is substantially greater than the force needed to axially push the marker rod onto the attachment fitting.

The marker rod preferably has a fluorescent exterior surface, although more preferably the marker rod is made of a translucent fluorescent color material such as fluorescent color nylon, with red being a particularly desirable color. This enables the marker rod to function in part as a light pipe by absorbing light from the marker light as well as from other light sources such as the headlights of an approaching aircraft and conducting same along the length thereof for emission of light along the length thereof. Consequently, the marker rod will have the appearance of a lighted pole. Also, the fluorescent color of the marker rod will be highly visible under daylight conditions.

The marker rod 22 preferably has a length of between about 24 inches and 30 inches and more preferably a length of about 28 inches. The marker rod preferably is a circular tube having an outer diameter in the range of about ½ inch to 1.0 inch and a wall thickness in the range of about 1/16 inch to ¼ inch. A reflective band 32 of tape may be optionally provided, the tape being wrapped around the marker rod at its upper end as shown in FIG. 2.

Referring back to FIG. 1, the marker 13 may be substituted for one of the mounting bolts 17 to mount the marker upright and also to secure the base plate of the marker light in place along with the mounting bolts. Preferably, the marker is mounted at the bolt hole furthest from the center of the taxiway so that light emitted by the marker light will strike the surface of the marker facing the taxiway. This will also locate the marker to the back side of the marker light relative to the taxiway so that it does not even partially block the view of the marker light from the taxiway. The marker thus forms a readily observable vertical extension of the marker light, while being flexible and bendable to accommodate, without damage, inadvertent contact, for example, with the wing of a taxying aircraft. The marker further assists in identifying the edge of a taxiway or runway, or for that matter any other way, when the marker lights have become hidden from view such as by a heavy accumulation of snow.

Although the invention has been shown and described with respect to a preferred embodiment, equivalent alterations and modifications will no doubt occur to others skilled in the art upon the reading and understanding of this specification. For example, the marker may be readily adapted for use with marker light mounting systems where threaded studs project upwardly from the support surface for passage through the bolt holes in the base of the marker light. Nuts are then used to secure the base in place by threading the same onto the threaded studs. With such mounting system, the lower end of the attachment fitting may be configured as a nut, i.e., provided with an internally threaded bore, for threading onto one of the threaded studs in place of one of the mounting nuts. The present invention includes all such equivalent alterations and modifications and is limited only by the scope of the following claims.

What is claimed is:

1. A marker system comprising a marker light and a marker; said marker light including a base plate having a plurality of bolt holes and a plurality of mounting bolts having threaded shanks extending through the plurality of bolt holes for securing said base plate to a support surface including threaded holes for receiving the threaded shanks of said plurality of mounting bolts; and said marker including a resiliently flexible marker rod having a lower end and an attachment fitting at the lower end of said resiliently flexible marker rod, said attachment fitting having a lower threaded shank portion for extending through one of the plurality of bolt holes in the base plate not occupied by a mounting bolt, and said attachment fitting further including an intermediate wrenching head portion and an upper portion to which the lower end of said resiliently flexible marker rod is attached.

2. A marker system as set forth in claim 1, wherein said resiliently flexible marker rod is tubular at least at a lower end portion thereof, and said lower end portion is telescoped over said upper portion of said attachment fitting.

3. A marker system as set forth in claim 2, wherein said lower end portion of said resiliently flexible marker rod has an interior surface, and said upper portion of said attachment fitting includes radially outwardly protruding means for gripping the interior surface of said lower end portion of said resiliently flexible marker rod.

4. A marker system as set forth in claim 3, wherein said radially outwardly protruding means includes a plurality of axially spaced apart ribs extending annularly around said upper portion of said attachment fitting.

5. A marker system as set forth in claim 1, wherein said resiliently flexible marker rod is tubular and is closed at its top end by a cap fitted onto said resiliently flexible marker rod.

6. A marker system as set forth in claim 1, wherein said resiliently flexible marker rod has a fluorescent exterior surface.

7. A marker system as set forth in claim 1, wherein said resiliently flexible marker rod is made of a translucent fluorescent color nylon.

8. A marker system as set forth in claim 1, wherein said resiliently flexible marker rod has a length of between about 24 inches and 30 inches.

9. A marker system as set forth in claim 1, wherein said marker includes a reflective band of tape surrounding said resiliently flexible marker rod at its upper end.

10. A marker assembly for use with a marker light including a base plate having a plurality of bolt holes and a plurality of bolts having threaded shanks extending through the plurality of bolt holes for securing the base plate to a support surface including threaded holes for receiving the threaded shanks of the plurality of bolts, said marker assembly including a resiliently flexible marker rod having a lower end and an attachment fitting at the lower end of said resiliently flexible marker rod, said attachment fitting having a lower threaded shank portion for extending through one of the plurality of bolt holes in the base plate, and said attachment fitting further including an intermediate wrenching head portion and an upper portion to which the lower end of the marker rod is attached.

11. A marker assembly as set forth in claim 10, wherein said resiliently flexible marker rod is tubular at least at a lower end portion thereof, and said lower end portion is telescoped over said upper portion of said attachment fitting.

12. A marker assembly as set forth in claim 11, wherein said lower end portion of said resiliently flexible marker rod has an interior surface, and said upper portion of said attachment fitting includes radially outwardly protruding means for gripping the interior surface of said lower end portion of said resiliently flexible marker rod.

13. A marker assembly as set forth in claim 12, wherein said radially outwardly protruding means includes a plurality of axially spaced apart ribs extending annularly around said upper portion of said attachment fitting.

14. A marker assembly as set forth in claim 10, wherein said resiliently flexible marker rod is tubular and is closed at its top end by a cap fitted onto said resiliently flexible marker rod.

15. A marker assembly as set forth in claim 10, wherein said resiliently flexible marker rod has a fluorescent exterior surface.

16. A marker assembly as set forth in claim 10, wherein said resiliently flexible marker rod is made of a translucent fluorescent color nylon.

17. A marker assembly as set forth in claim 10, wherein said resiliently flexible marker rod has a length of between about 24 inches and 30 inches.

18. A marker assembly as set forth in claim 10, wherein said marker includes a reflective band of tape surrounding said resiliently flexible marker rod at its upper end.

19. A marker system comprising a marker light and a marker;

said marker light including a base plate having a plurality of bolt holes and a plurality of mounting bolts extending through the plurality of bolt holes for securing said base plate to a support surface; and said marker including a resiliently flexible marker rod having a lower end and an attachment fitting at the lower end of said resiliently flexible marker rod, said attachment fitting connecting said resiliently flexible marker rod to said marker light with said resiliently flexible marker rod extending upwardly to a height greater than the height of said marker light, said attachment fitting being mounted to said base plate at one of said plurality of bolt holes.

* * * * *